United States Patent [19]
Lohr

[11] 3,913,496
[45] Oct. 21, 1975

[54] ROAD-TRANSPORT VEHICLE-CARRIER

[75] Inventor: Robert Lohr, Strasbourg, France

[73] Assignee: Lohr-Construction de Vehicules Industriels S.A., Hangenbieten, France

[22] Filed: Oct. 26, 1973

[21] Appl. No.: 410,084

[30] Foreign Application Priority Data
Jan. 17, 1973 France .............................. 73.02042

[52] U.S. Cl. .............................. 105/368 R; 296/1 A
[51] Int. Cl.² .......................................... B61D 3/02
[58] Field of Search .................. 105/368 R; 296/1 A

[56] References Cited
UNITED STATES PATENTS
3,424,489 1/1969 Hoy ............................. 105/368 R X
3,449,010 6/1969 Hoy ............................. 105/368 R X
3,547,049 12/1970 Sanders ........................... 105/368 R
3,690,717 9/1972 Taylor ........................ 105/368 R X Primary Examiner—M. Henson Wood, Jr.
Assistant Examiner—Gene A. Church
Attorney, Agent, or Firm—Young & Thompson

[57] ABSTRACT

The disclosure is of a road-transport vehicle-carrier characterised in that each support post is articulated to the upper platform and to the lower platform and in that when the upper platform is lowered each post folds along the lower platform by displacement of its lower articulation in a slideway.

7 Claims, 4 Drawing Figures

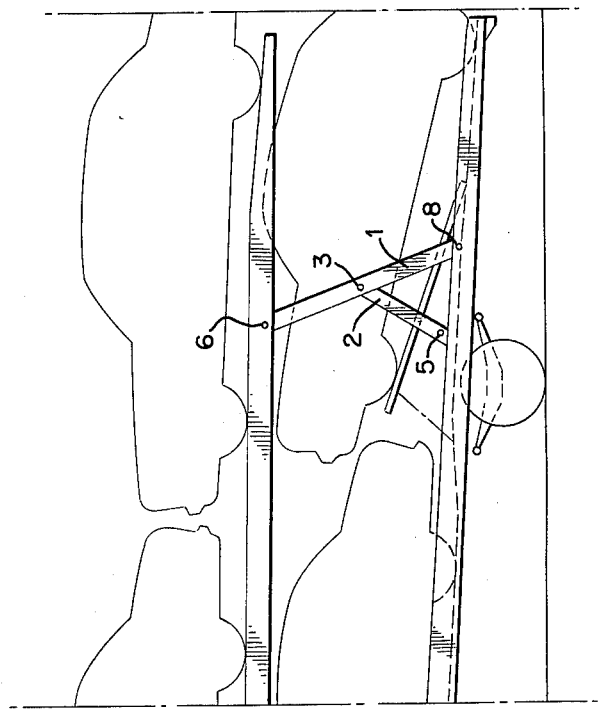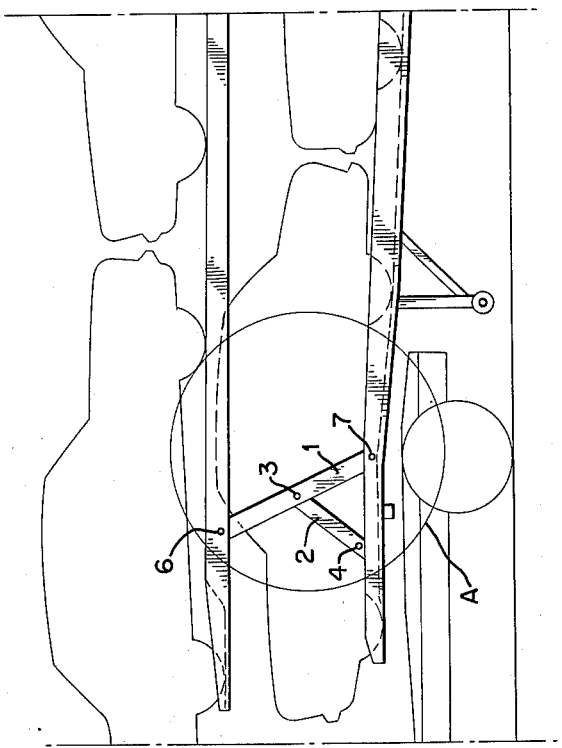
FIG. 1

FIG. 2
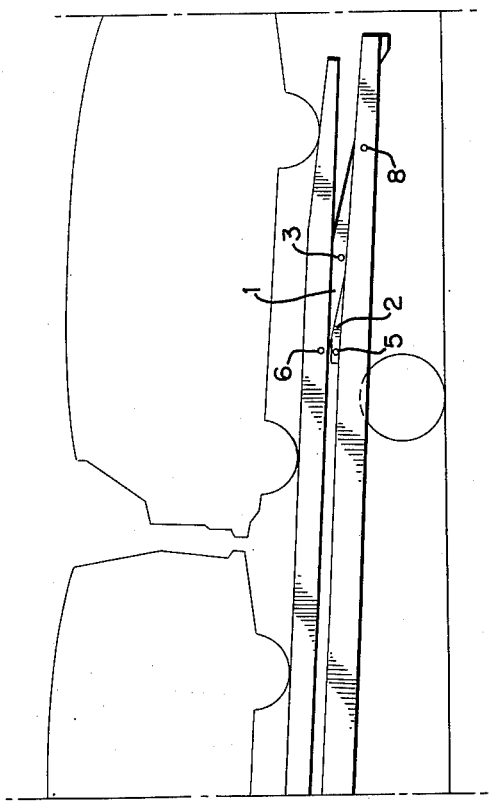
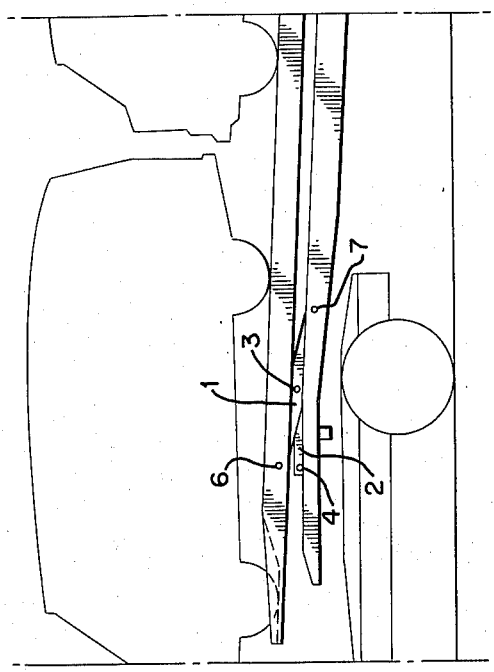

ROAD-TRANSPORT VEHICLE-CARRIER

INTRODUCTION AND BACKGROUND OF THE INVENTION

The present invention relates to vehicles serving for the transport of motor cars, and more especially road-transport vehicle-carriers.

The known carriers of this kind generally comprise a lower loading platform and an upper loading platform which is held spaced from the lower platform by means of fixed posts. Since however for the transport of utility vehicles loading is effected solely on the lower level, after removal of the upper platform, the fixed posts, which rise vertically from the lower platform, constitute a certain hindrance, especially by reason of the fact that the loading width and thus the width of the transported vehicles is limited by the spacing of these posts. Moreover it goes without saying that in the case of empty packing, especially when semi-trailers are concerned, the presence of such fixed posts prevents any superimposition.

In order to diminish these drawbacks the present invention has for its object the provision of improvements in such vehicle-carriers, by virtue of which the lowering of the upper platform at the same time causes the retraction of the support posts and thus the obtaining of a loading area which is in no wise limited in width.

BRIEF SUMMARY OF THE INVENTION

According to the invention each of the support posts of the upper platform is articulated to the latter at its upper end, while its other end is movable along the lower platform.

FURTHER DESCRIPTION AND ADVANTAGES OF THE INVENTION

According to another characteristic of the invention, the lower end of each post is articulated in two slide shoes which are displaced under the action of a ram, for example a single-acting ram, in a double slideway fast with the lower platform.

The following description relates to a form of embodiment of the invention which is given by way of non-limitative example and explained with reference to the accompanying drawings.

BRIEF DESCRIPTION OF THE VIEWS IN THE DRAWINGS

FIG. 1 is a partial diagrammatic profile view of a vehicle-carrier train the upper platform of which is in the raised position, FIG. 2 is a view identical with FIG. 1 with the upper platform in the lowered position, FIG. 3 is a sectional view on a larger scale of the detail A in FIG. 1, and FIG. 4 is a partial view in the direction of the arrow F in FIG. 3.

DETAILED DESCRIPTION OF THE PREFERRED EMBODIMENTS

Figure 3:
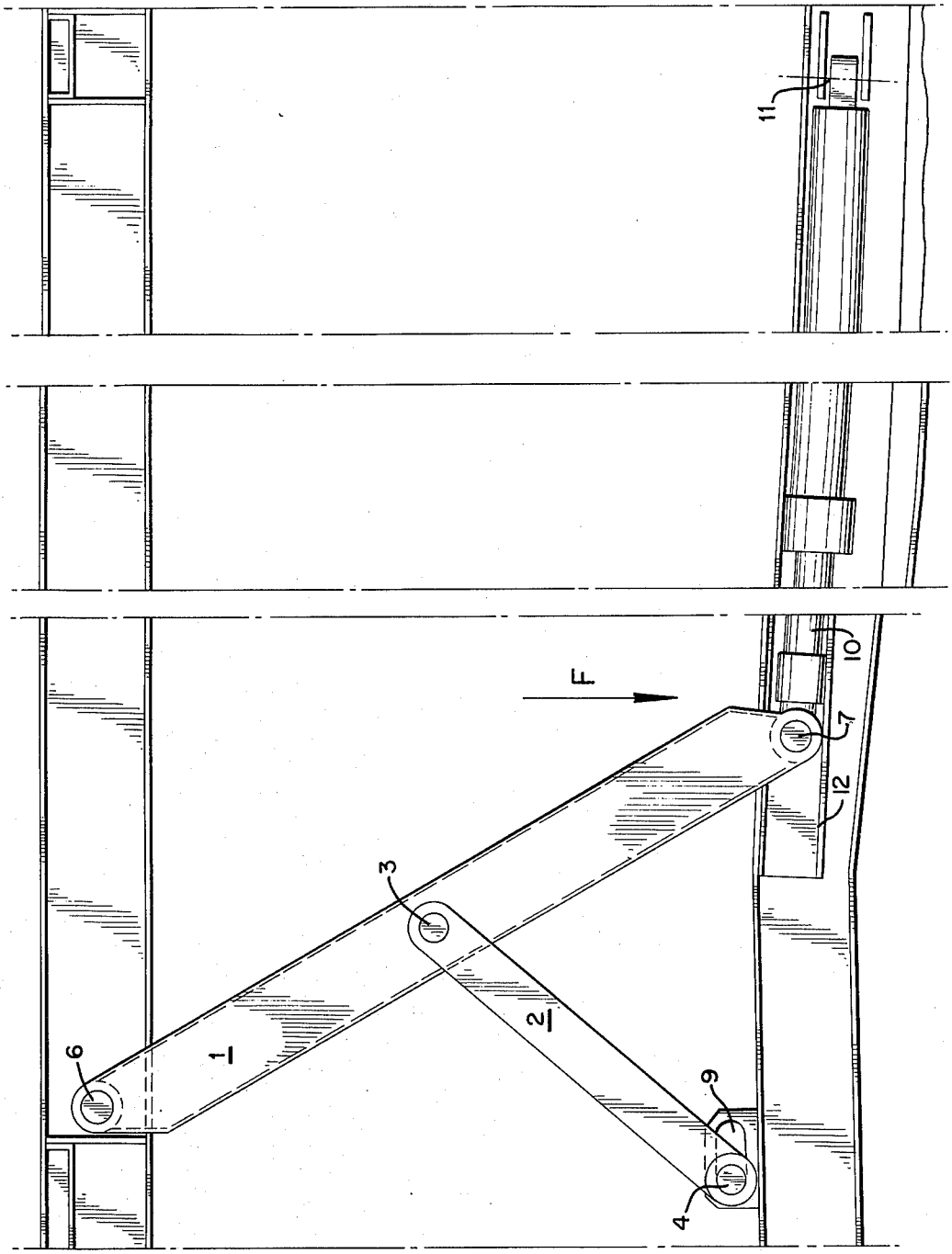

As represented in the drawings, the upper and lower platforms of the vehicle-carrier train are interconnected by posts 1 articulated at 6, 7 and 8 to the upper and lower platforms respectively. A strut 2 is connected at 3 to each post and its other end is articulated to the lower platform at 4, 5.

Figure 4:
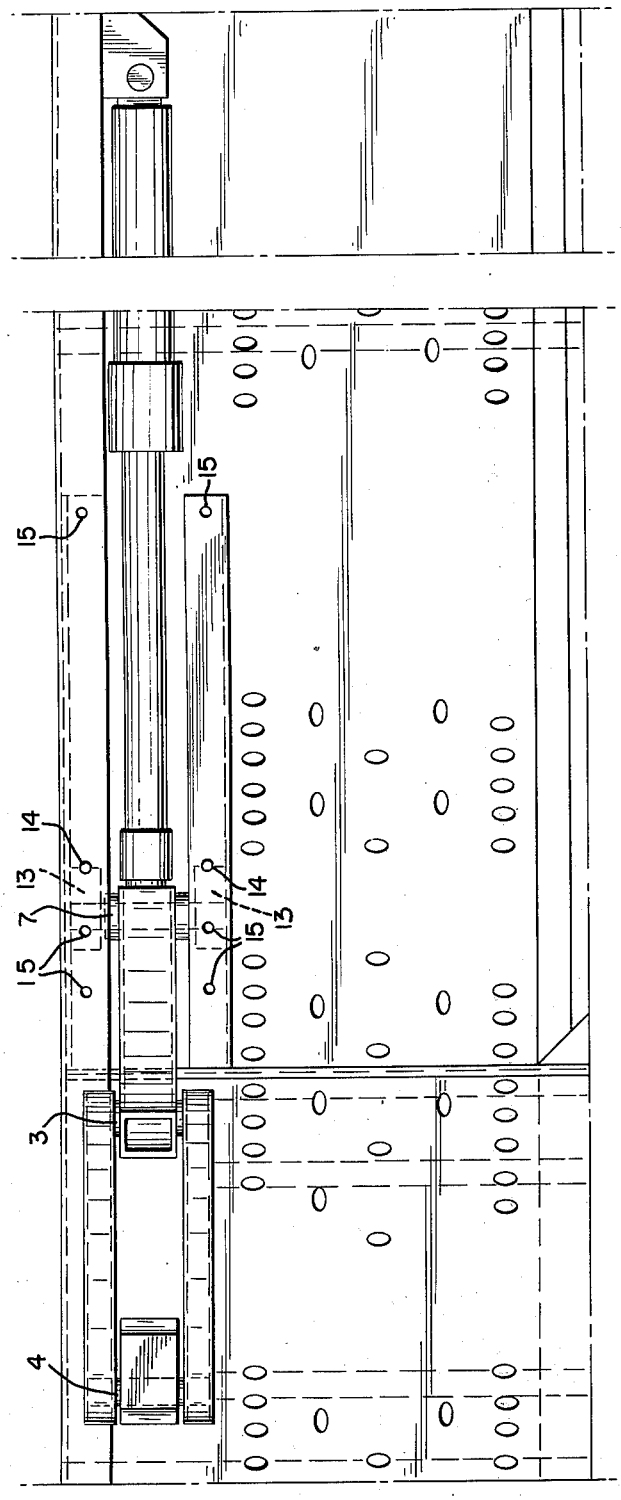

As clearly shown by FIGS. 3 and 4 with regard to the front post, the lower end of this post is connected by a spindle 7 to a ram 10, for example a single-acting ram, which is articulated at 11 to the lower platform.

At each end the spindle 7 is equipped with a slide shoe 13 which is displaceable under the action of the ram 10 in a double slideway 12.

In order to obtain correct operation of the apparatus in the lowering and raising of the upper platform, the pivot pin or spindle 4 of the strut 2 of the front post is lodged in a slot 9 permitting a slight displacement of this spindle 4.

According to another characteristic of the invention, the posts 1, which are operated in pairs by means of the rams 10, are lockable in the raised position by pegs 14 which are introduced into holes 15 provided in the double slideway 12, against which pegs the slide shoes 13 come to abut.

The loading of vehicles onto a train equipped with the improvements according to the present invention is effected in the following manner:-

Starting from the position as represented in FIG. 2, that is to say the position in which the upper platform is lowered, the pair of rams acting upon the front posts is operated until these posts are entirely opened out, the loading of the vehicles upon the upper platform is effected and then the pair of rams acting upon the rear posts is operated in order to clear the lower platform and permit its loading.

By way of safety, when the upper platform is in the raised position, the pegs 14 are introduced into the holes 15 situated behind the slide shoes 13.

For the unloading of the vehicles the converse procedure is adopted, in that after the unloading of the vehicles from the lower platform firstly the action of the rams 10 of the rear posts and then, after unloading of the vehicles from the upper platform, the action of the rams 10 of the front posts is eliminated.

The invention is not of course limited to the form of embodiment as described and represented, and modifications remain possible, especially from the design point of view, without thereby departing from the scope of protection of the invention.

What is claimed is:

1. A road transport vehicle carrier, comprising a road vehicle chassis, a lower platform supported by said chassis, a plurality of front and rear posts supported on said lower platform, an upper platform articulatedly carried by the upper ends of said front and rear posts, and means mounting the lower ends of said front and rear posts for movement lengthwise along the lower platform thereby to raise and lower both the front end and the rear end of said upper platform.

2. A vehicle carrier as claimed in claim 1, and a strut pivotally connected at one end to the lower platform and at the other end to a point intermediate the length of each of said posts.

3. A vehicle carrier as claimed in claim 2, the end of strut pivotally connected to said lower platform riding in a slot that extends lengthwise of said lower platform.

4. A vehicle carrier as claimed in claim 1, and fluid pressure rams for moving said lower ends of said posts lengthwise of said lower platform.

5. A vehicle carrier as claimed in claim 1, said lower ends of said posts being articulated to slide shoes that slide in slideways that extend lengthwise of said lower platform.

6. A vehicle carrier as claimed in claim 5, there being two said slideways for the lower end of each said post.

7. A vehicle carrier as claimed in claim 5, and pegs for releasably securing said slide shoes in a position to maintain said posts and upper platform raised.

* * * * *